J. JOHNSON.
Fish Hook.
No. 13,649.
Patented Oct. 9, 1855.
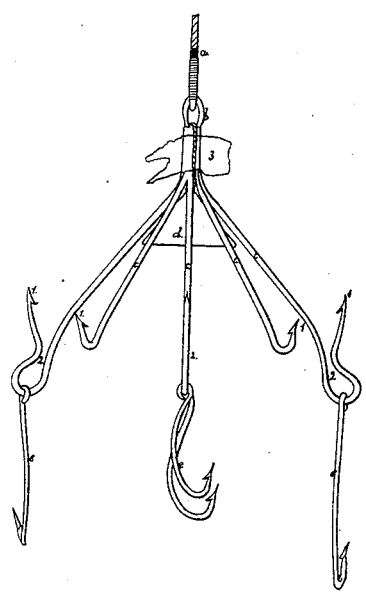
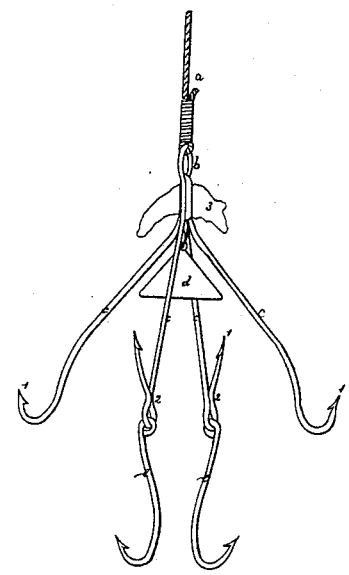
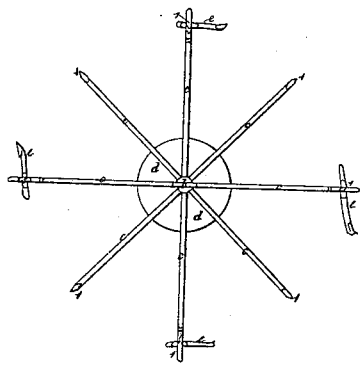
Witnesses:
Lemuel W. Serrell
Thomas G. Harold
Inventor:
Job Johnson

UNITED STATES PATENT OFFICE.

JOB JOHNSON, OF BROOKLYN, NEW YORK.

IMPROVED FISH-HOOK.

Specification forming part of Letters Patent No. 13,649, dated October 9, 1855.

*To all whom it may concern:*

Be it known that I, JOB JOHNSON, of Brooklyn, in the county of Kings and State of New York, have invented, made, and applied to use certain new and useful Improvements in Fish-Hooks; and I do hereby declare that the following is a full, clear, and exact description of the construction and operation of the same, reference being had to the annexed drawings, making part of this specification, wherein—

Figure 1 is a plan of my improved fish-hook with eight points. Fig. 2 is a side elevation of the same as ready for use; and Fig. 3 is a similar side elevation with but four instead of eight hooks, although a greater or less number of hooks might be used.

Similar marks of reference indicate the same parts.

The nature of my said invention consists in constructing a cluster of hooks in a spider form, joined together in the center where the line is attached, and also provided with a sinker beneath the cluster of hooks. The bait is to be attached in a mass around the shank of the hooks, near where the line is attached, and the cluster of hooks standing out all around below the bait, when the angler feels the fish nibbling at the bait he suddenly jerks up the spider or cluster of hooks, catching the fish by the gills, and securing him. Thus one or more fish can be caught as they stand radially around nibbling at the bait.

The hooks being below and out of sight to the fish, I make use of them also by a peculiar spring-throat to receive separate hooks that can each be baited separately, and hanging from the ends of the spider or cluster of hooks, each hook is kept separate from the others and is not liable to become entangled. Thus fish coming up from below can be caught as well as in the ordinary manner, and the spring-throat on the end of the arms of the spider enables me to hook on different-sized hooks adapted to the fish abounding in the vicinity, and each hook hangs separate when in use, and great facility is given for speedily changing hooks, instead of the inconvenience and loss of time now usual in tying or splicing on hooks to a line, and when any hook becomes entangled or broken in a fish the same can be slipped off and a new one substituted.

In the annexed drawings, *a* is a line or cord, of suitable size, passed through and secured to an eye, *b*, formed in the wire of which the spider *c c* is composed, and the said spider *c c*, composed of any suitable number of arms, is brazed together near the loop *b*, so as to be permanently constructed. On the end of the arms *c c* hooks 1 1 are formed, which act to catch the fish which may be nibbling at the bait placed around the shank, as at 3 3, when said hooks are suddenly raised by a pull on the line *a;* and 2 2 are the throats formed near the ends of the arms *c c*, which spring open as the hooks *e e* are forced on, and close again sufficient to retain the hook in place when in use. Thus these hooks *e* can be changed or replaced in the manner and for the purposes before detailed.

*d* is the sinker to keep the hooks in place.

I do not claim forming a spider of hooks in themselves, as the same have been used for meat and a variety of other purposes; but

What I claim, and desire to secure by Letters Patent, is—

1. The method herein described and shown of catching fish by means of a cluster or spider of hooks beneath and around suitable bait, so that said hooks can be suddenly raised up and catch the fish while nibbling at the bait, in the manner and for the purposes specified.

2. The method herein set forth of attaching and hanging the hooks *e* from the ends of the spider-arms *c* by means of the spring-throat 2, whereby said hooks can be varied or replenished, in the manner and for the purposes specified.

In witness whereof I have hereunto set my signature this 8th day of September, 1855.

JOB JOHNSON.

Witnesses:
LEMUEL W. SERRELL,
THOMAS G. HAROLD.